United States Patent [19]
New, Sr.

[11] Patent Number: 6,036,739
[45] Date of Patent: Mar. 14, 2000

[54] KNITTED FELT FILTRATION MEDIA

[76] Inventor: Curry W. New, Sr., 245 Keever Dr., Denton, N.C. 27239

[21] Appl. No.: 09/014,966

[22] Filed: Jan. 28, 1998

Related U.S. Application Data

[60] Provisional application No. 60/036,817, Feb. 3, 1997.
[51] Int. Cl.$^7$ .................................................. B01D 39/08
[52] U.S. Cl. .......................... 55/527; 26/29 R; 66/8; 66/170; 55/528; 55/DIG. 5; 55/DIG. 43; 210/499
[58] Field of Search .................. 55/527, 528, 486, 55/487, DIG. 43, DIG. 5; 210/499; 442/304; 26/29 R; 66/8, 79, 197, 170, 169 R

[56] References Cited

U.S. PATENT DOCUMENTS

| | | | |
|---|---|---|---|
| 4,181,514 | 1/1980 | Lefkowitz et al. | 55/528 |
| 4,225,642 | 9/1980 | Hirakawa | 55/528 |
| 4,284,507 | 8/1981 | Beane | 55/DIG. 43 |
| 4,322,232 | 3/1982 | Beane | 55/DIG. 43 |
| 4,597,784 | 7/1986 | Albrecht et al. | 55/528 |
| 5,230,226 | 7/1993 | Saarikettu | 55/528 |

FOREIGN PATENT DOCUMENTS

| | | | |
|---|---|---|---|
| 2238520 | 2/1975 | France | 55/DIG. 43 |
| 58-207917 | 12/1983 | Japan | 55/527 |
| 1437076 | 11/1988 | U.S.S.R. | 55/527 |

OTHER PUBLICATIONS

Handbook of Material Trade Names, Supplement IV, ed. Zimmerman et al., Industrial research Service, Inc. Dover, New Hampshire, 1965, p. 184, 1965.

*Primary Examiner*—Duane S. Smith
*Attorney, Agent, or Firm*—Jenkins & Wilson, P.A.

[57] ABSTRACT

An improved filter media that is stable in both the lengthwise and widthwise directions and that does not stretch or similarly distort during pressure stops and starts. The filter media is formed from a circular knitted felt fabric having a napped face and a knitted back.

9 Claims, 4 Drawing Sheets

```
FEED  1  WWWT  -  Tuck Feed  -  1/400-94
      2  TWWW  -  Tuck Feed  -  1/400-94
      3  WWTW  -  Tuck Feed  -  1/400-94
                                              Den
      4  KKKK  -  Knit Feed  -  2-1/150-68 - 300 - 136 FiL
      5  WTWW  -  Tuck Feed  -  1/400-94
      6  WWWT  -  Tuck Feed  -  1/400-94
      7  WKWK  -  Knit Feed  -  2-1/150-68
      8  WWWT  -  Knit Feed  -  2-1/150-68
      9  TWWW  -  Knit Feed  -  2-1/150-68
     10  WWTW  -  Knit Feed  -  2-1/150-68
     11  KKKK  -  Knit Feed  -  2-1/150-68
     12  WTWW  -  Knit Feed  -  2-1/150-68
     13  WWWT  -  Knit Feed  -  2-1/150-68
     14  KWKW  -  Knit Feed  -  2-1/150-68

Total-  4800 Den per Repeat

14  Feed Repeat
```

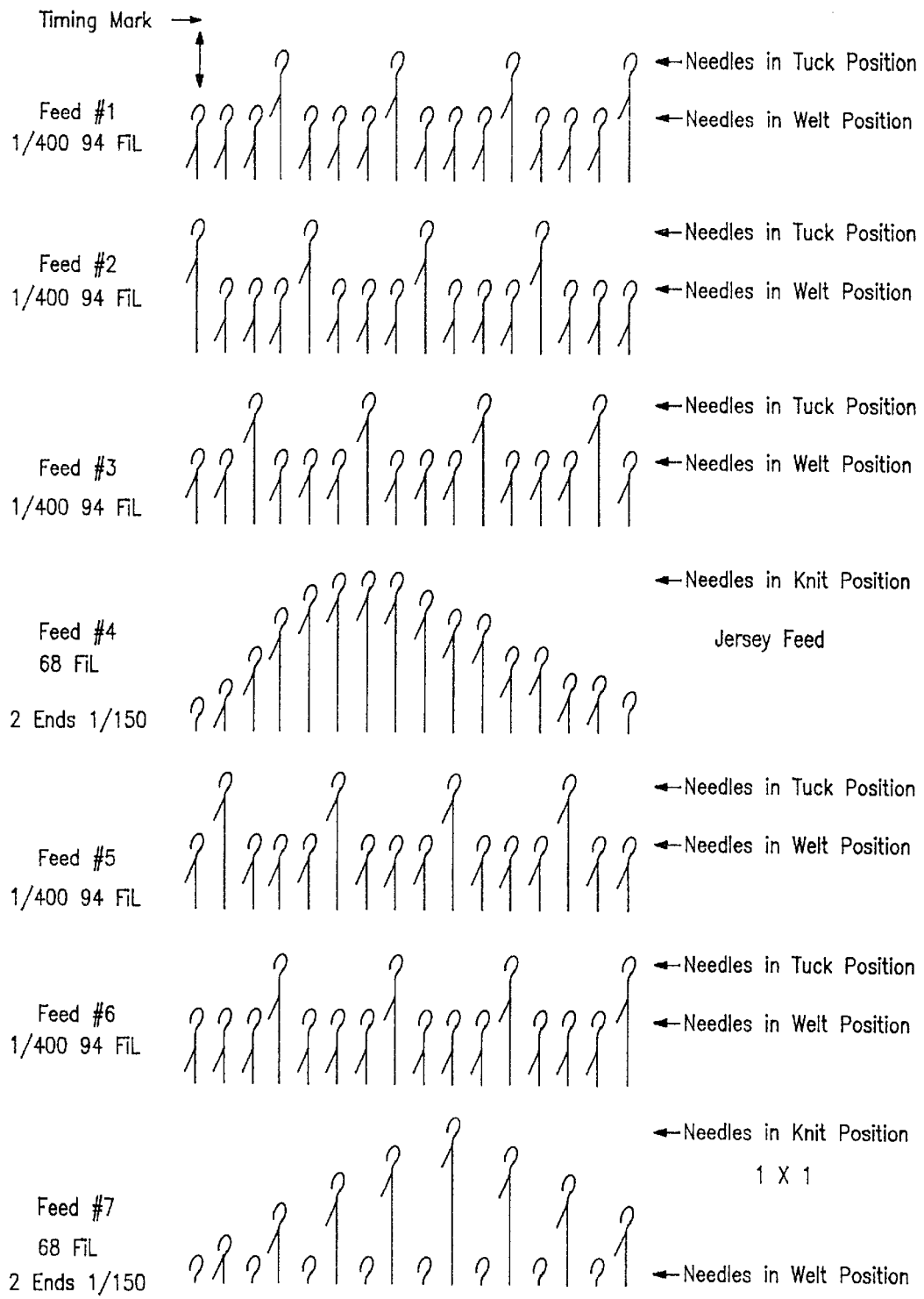
FIG. IA

| | | | | |
|---|---|---|---|---|
| FEED | 1 WWWT | – | Tuck Feed | – 1/400–94 |
| | 2 TWWW | – | Tuck Feed | – 1/400–94 |
| | 3 WWTW | – | Tuck Feed | – 1/400–94 |
| | 4 KKKK | – | Knit Feed | – 2-1/150–68 – 300 $\overset{Den}{-}$ 136 FiL |
| | 5 WTWW | – | Tuck Feed | – 1/400–94 |
| | 6 WWWT | – | Tuck Feed | – 1/400–94 |
| | 7 WKWK | – | Knit Feed | – 2-1/150–68 |
| | 8 WWWT | – | Knit Feed | – 2-1/150–68 |
| | 9 TWWW | – | Knit Feed | – 2-1/150–68 |
| | 10 WWTW | – | Knit Feed | – 2-1/150–68 |
| | 11 KKKK | – | Knit Feed | – 2-1/150–68 |
| | 12 WTWW | – | Knit Feed | – 2-1/150–68 |
| | 13 WWWT | – | Knit Feed | – 2-1/150–68 |
| | 14 KWKW | – | Knit Feed | – 2-1/150–68 |

Total– 4800 Den per Repeat

14 Feed Repeat

FIG. 3

KNITTED FELT FILTRATION MEDIA

RELATED APPLICATIONS

This application is a conventional U.S. patent application claiming priority to pending U.S. provisional patent application Ser. No. 60/036,817 filed Feb. 3, 1997 in the U.S. Patent and Trademark Office.

TECHNICAL FIELD

The present invention relates to filter media, and more particularly related to an improved filter media that possesses two-way dimensional stability and precise maintenance of airflow through the filter media.

RELATED ART

Well-known filter media positioned in a filter media housing have been traditionally used to separate particles from air or fluid from fluid. Conventional and well-known filter media have been made from conventional fabrics such as tightly-knitted terry fabric, woven and non-woven fabrics. The shortfall of all of these fabrics is that they do not provide constant and uniform performance. For example, non-woven and woven fabrics have good dimensional stability but do not possess good control of soil release and pressure drops during use as a filter media. Each time the fluid or airflow through the filter media is started, different readings are given because of the amount of particles in or on the face of the filter media. Similarly, conventional basic knitted fabric filter media give different readings in use due to stretch in both directions. The different readings are due to the variable size of openings in the knitted fabric during use.

Conventional fabrics that are well-known for use as filter media are felts, tight-knitted terry fabric, fake furs, non-woven fabrics and woven fabrics. Felts, woven and non-woven fabrics are typically produced in open-width form with a width of about 54 to 58 inches. Terry filter media are normally produced in tubular form.

DISCLOSURE OF THE INVENTION

In accordance with the present invention, applicant provides an improved filter media that is stable in both the lengthwise and horizontal directions and that provides constant performance characteristics. The improved filter media comprises a circular knitted felt-type fabric having a napped face surface and a knitted back surface. Typically, the napped and finished knitted filter media is installed in a filter media housing and in the pathway of an airflow or other fluid flow to be filtered.

It is therefore an object of the present invention to provide an improved filter media.

It is another object of the present invention to provide an improved filter media that is stable in both the lengthwise and horizontal directions and that provides constant or uniform performance characteristics when in use.

It is still another object of the present invention to provide a circular knitted felt-type fabric for use as an improved filter media that possesses the favorable characteristics of both felt fabrics and loop or pile fabrics but that does not possess the unfavorable characteristics of these fabrics.

Some of the objects of the invention having been stated hereinabove, other objects will become evident as the description proceeds, when taken in connection with the accompanying drawings as best described hereinbelow.

BRIEF DESCRIPTION OF THE DRAWINGS

FIGS. 1A, 1B is a drawing showing a representative circular knitting machine set up to manufacture the circular knitted fabric for the filter media of the invention;

FIG. 3 is a drawing illustrating the feed wheel set up for a 14 feed repeat construction of the felt-type filter media fabric.

BEST MODE FOR CARRYING OUT THE INVENTION

Figure 1B:
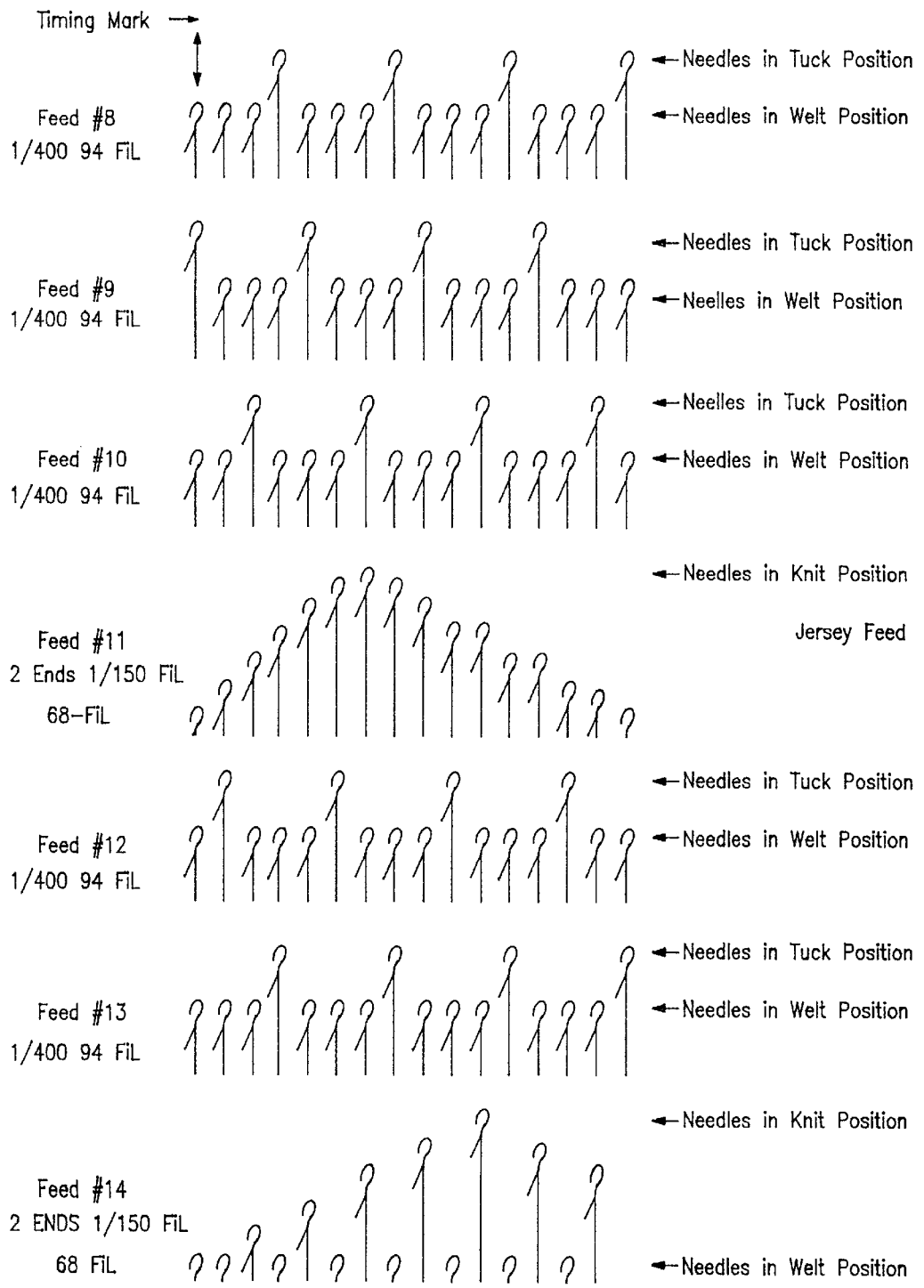

Applicant's novel filter media provides a stable fabric in both directions (lengthwise and widthwise). The face is napped and the knitted construction on the back of the fabric imparts strength to the fabric in order to prevent bursting at high pressure start-ups during use as a fluid filtration media. The knitted construction also serves to prevent unraveling of the filter media fabric.

Applicant contemplates that the filter media of the invention will be made in tubular form to prevent the necessity for seams in filter bags made with the media of the present invention. However, the finished product can be slit in order to make a flat filter media if it is desired to do so.

Applicant notes that various yarns and stitches per inch construction can be selected that will regulate the amount of fluid flow (normally airflow) that has been determined to be necessary for different applications of the filter media. The novel filter media will maintain airflow more precisely than conventional filter fabrics known to those skilled in the art. Preferably, applicant prefers that the novel filter media is produced with polyester, nylon, fiberglass, polypropylene and/or KYNAR brand, a vinylidene fluride; yarns, and has found polyester to be particularly useful.

Applicant's novel filter media fabric construction is, in essence, a combination of two different types of fabrics that are presently on the market for use as filter media. One fabric is a felt fabric and the other fabric is a loop (or pile) fabric. Felt fabrics are used as filter media due to their stability in both directions, but felt fabrics are limited to manufacturer constructions for upholstery applications. In contrast, loop or pile fabrics have a jersey knit fabric on the back of a pile or loop face surface. This serves to tighten up the fabric with more courses per inch in order to provide the density required for satisfactory airflow restriction. The problem with this type of filter media is that the loop or pile fabric tends to stretch in both directions. Thus, when air pressure or water pressure is applied, the loop or pile fabric filter media will stretch. This results in larger openings in the fabric construction that allow more air or water to pass through the filter media. Each time the pressure is stopped and started a different pressure drop may be obtained. This can be a serious problem when a filter media is regulated by pressure drop readings.

Applicant's Filter Media Fabric

Most fabrics are produced in open-width form which makes it difficult or expensive to be sewn into a tubular form. Sewing also tends to add to airflow and fluid flow problems as well as bursting when the fabric is used in a filter media application. Applicant's fabric does not possess these disadvantages.

Applicant's novel filter media fabric construction utilizes the overcoat method of covering the face of the fabric wherein the face is the napped or brushed side of the fabric. During knitting of the filter media fabric, the napped or brushed face of the fabric is formed as the inside of the tubular form being knitted on a circular knitting machine.

The back of the filter media fabric is formed using tested constructions of needle arrangements to produce the strongest construction possible on a circular knitting machine. The combination of these two face and back constructions form the filter media fabric in accordance with the present invention.

Although applicant's novel improved filter media can be constructed in a wide variety of ways in order to produce the napped face surface and knitted back surface necessary to form the filter media of the present invention, applicant has determined certain preferred fabric constructions which will be described in detail hereinafter. However, applicant wishes to note that these representative constructions described hereinbelow and shown in FIGS. 1 and 2 of the drawings are intended only to be representative of applicant's novel filter media invention and not to suggest any limitation to the invention. The scope of applicant's inventive filter media is determined by the claims appended hereto.

A. Yarns and Construction

The yarn content of the filter media will be 70–1000 denier yarn being 2-ply, S-twist, Z-twist, and single end.

Fabric can be produced with polyester, nylon, polypropylene, fiberglass and kynar yarns. The finished fabric has between 30–40 wales, 25–50 courses and will be produced on 9"–30" diameter machines with 14–28 cut (needles per inch) machines.

B. Machinery

Construction of the novel fabric is preferably accomplished on single knit circular knitting machines.

Examples of raceway machines that can be used are:
(a) VANGUARD 4SJ4
(b) MONARCH XL4R Examples of pattern wheel machines that can be used are:
(a) SINGER SUPREME RoF, RoFII
(b) MONARCH PFW There are numerous single knit machines that could be used to make applicant's filter media including the following: SINGER, ORIZIO, ALBI, BENTLEY, MONARCH, JIMBERCA, LEBOCEY, PA LUNG, CAMBER, MAYER, TERROT, KEUM YONG, STIBBE, SCOTT & WILLIAMS, WILDMAN, and VANGUARD machines. All of these machines are one of the following three types:

(1) Pattern Wheel Machine which gives 120–144 selection in one repeat; or
(2) Mini Jack Machine that has 5–32 selections at a given feed; or
(3) Raceway Machine that has 1–4 tracks of needles with some running at high speed.

C. Representative Construction of Finished Filter Media on MONARCH 4 Track XL4R Raceway Machine 1. A mixture of 150/1 300/1 400/1 polyester, polypropylene, fiberglass, nylon or kynar (see FIG. 3) will be placed on the creel of the knitting machine.
(2) Needle arrangements are made in the cylinder of the knitting machine.
(3) Cam arrangements are made in the knitting machine.
(4) Stitch adjustments are made to match feed-in readily.
(5) A 3-tape system is used to maintain control.
(6) Spreader width is adjusted to get maximum width.
(7) Maximum roll weight will be run.
(8) The roll of greige fabric will be taken to a finishing plant.
(9) The greige fabric will be scoured to remove any oil from the yarn.
(10) The fabric will be napped on a conventional napper machine.
(11) The finished fabric will be at a given width for the industry (10"–50" tubular).

The filter media fabric will be run in a predetermined roll size and air or fluid flow specification. The rolls will be color coded for visible identity of different CFM spec.

D. Representative Set-Up on a SINGER SUPREME RoF Machine

Figure 2:
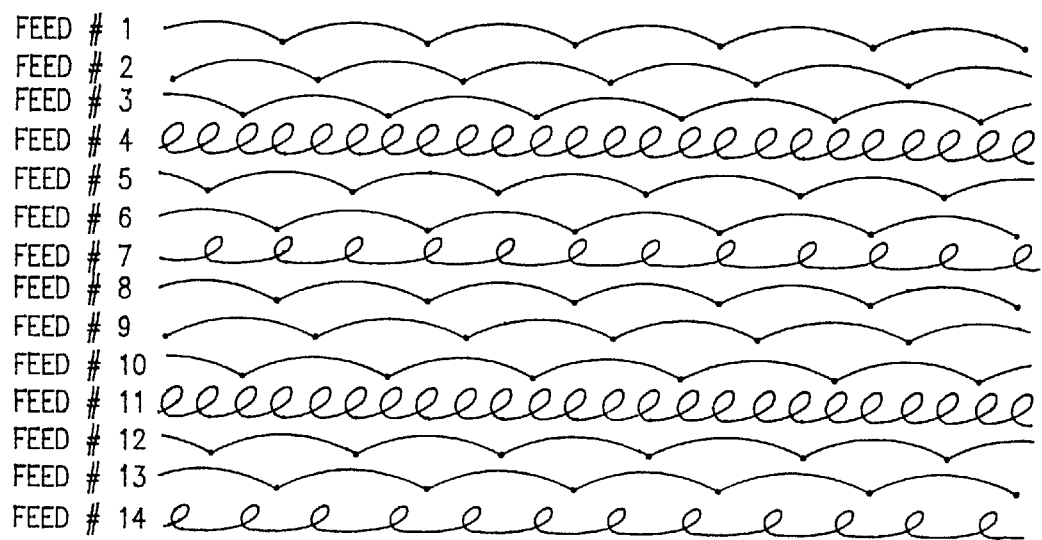
FIG. 2 is a drawing illustrating a representative construction of the felt-type filter media fabric of the present invention.

FIGS. 1A, 1B represents the set-up of a SINGER SUPREME RoF machine with a 14 feed repeat to make a representative filter media fabric according to the invention. The machine is an 18 cut 36 feed wheel machine with 26 inch diameter and 1,500 needle cylinder. The total denier of the knitted filter media per repeat is 4800 denier. The filter media knitted fabric will then be finished in an open width, over-feed frame with 54 inch pins at a selected heat set temperature. FIG. 2 shows a schematic view of the 14 feed repeat fabric construction made in accordance with applicant's invention. FIG. 3 shows the set up of the 14 feed wheels for a 14 feed repeat of the construction.

It will be understood that various details of the invention may be changed without departing from the scope of the invention. Furthermore, the foregoing description is for the purpose of illustration only, and not for the purpose of limitation—the invention being defined by the claims.

What is claimed is:

1. An improved filter media that is stable in both the lengthwise and horizontal directions, said media comprising a seamless single knit circular knitted felt fabric having a napped face surface and irregular knitted back surface.

2. The filter media according to claim 1, wherein the filter media comprises between 30–40 wales per inch and 25–50 courses per inch.

3. The filter media according to claim 1, wherein the filter media is formed from yarns selected from the group consisting of polyester, nylon, polypropylene, fiberglass and vinylidene fluoride.

4. The filter media according to claim 1, wherein the face surface of the filter media is formed as the inside of the circular knitted felt fabric as the fabric is constructed on a knitting machine.

5. In combination, a filter media housing and an improved filter media that is stable in both the lengthwise and horizontal directions, said media comprising a seamless single knit circular knitted felt fabric having a napped face surface and a irregular knitted back surface.

6. The combination according to claim 5, wherein the filter media comprises between 30–40 wales per inch and 25–50 courses per inch.

7. The combination according to claim 5, wherein the filter media is formed from yarns selected from the group consisting of polyester, nylon, polypropylene, fiberglass and vinylidene fluoride.

8. The combination according to claim 5, wherein the face surface of the filter media is formed as the inside of the circular knitted felt fabric as the fabric is constructed on a knitting machine.

9. A process for installing an improved filter media that is stable in both the lengthwise and horizontal directions in a filter media housing, said process comprising the steps of:

(a) circular knitting a seamless single knit felt fabric having a face surface adapted to be napped and a irregular knitted back surface, wherein the face surface forms the inside surface of the circular knitted fabric;

(b) selecting predetermined yarns and making predetermined adjustments to the circular knitting machine to achieve a predetermined airflow capability of the finished knitted fabric;

(c) scouring the knitted fabric to remove oil residue;

(d) napping the face surface of the knitted fabric on a napping machine;

(e) finishing the knitted fabric;

(f) providing a filter media housing having an airflow pathway therethrough; and (g) installing the napped and finished knitted fabric in a filter media housing and in the pathway of an airflow to filtered by the circular knitted fabric.

* * * * *